(12) United States Patent
Kokaku et al.

(10) Patent No.: US 6,329,037 B1
(45) Date of Patent: Dec. 11, 2001

(54) MAGNETIC RECORDING MEDIUM AND MAGNETIC MEMORY

(75) Inventors: Yuuichi Kokaku, Yokohama; Yoshinori Honda, Hiratsuka; Toshinori Ono, Odawara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/529,554

(22) PCT Filed: Mar. 13, 1998

(86) PCT No.: PCT/JP98/01064

§ 371 Date: Apr. 14, 2000

§ 102(e) Date: Apr. 14, 2000

(87) PCT Pub. No.: WO99/46765

PCT Pub. Date: Sep. 16, 1999

(51) Int. Cl.$^7$ .................................................. G11B 5/72
(52) U.S. Cl. .................. 428/65.3; 428/216; 428/408; 428/694 TC; 428/900
(58) Field of Search ................... 428/408, 694 TC, 428/900, 216, 65.3

(56) References Cited

U.S. PATENT DOCUMENTS

| | | | |
|---|---|---|---|
| 5,227,211 | 7/1993 | Eltoukhy et al. | 428/64 |
| 5,607,783 | 3/1997 | Onodera | 428/694 T |
| 5,679,431 | 10/1997 | Chen et al. | 428/65.3 |
| 5,734,519 | 3/1998 | Fontana, Jr. et al. | 360/97.01 |
| 5,871,841 | * 2/1999 | Kuratomi | 428/332 |
| 5,945,191 | * 8/1999 | Hwang et al. | 428/65.5 |

FOREIGN PATENT DOCUMENTS

| | | |
|---|---|---|
| 61-211826 | 9/1986 | (JP) . |
| 62-28918 | 2/1987 | (JP) . |
| 62-287415 | 12/1987 | (JP) . |
| 63-197028 | 8/1988 | (JP) . |
| 3-19150 | 1/1991 | (JP) . |
| 5-258288 | 10/1993 | (JP) . |
| 7-57249 | 3/1995 | (JP) . |
| 7-85461 | 3/1995 | (JP) . |
| 5-128487 | 5/1995 | (JP) . |
| 7-169137 | 7/1995 | (JP) . |
| 7-296373 | 11/1995 | (JP) . |

* cited by examiner

*Primary Examiner*—Stevan A. Resan
(74) *Attorney, Agent, or Firm*—Mattingly, Stanger & Malur, P.C.

(57) ABSTRACT

A magnetic recording medium includes at least a substrate, a recording layer formed of a non-magnetic underlying layer and a ferromagnetic thin film, deposited on the substrate, and a protective layer and a lubricant layer overlying the recording layer, a laminate layer is used as the protective layer, wherein a Young's modulus in a head pressing direction is twice or more larger than a Young's modulus in a head running direction.

In this way, the durability of the magnetic disk can be significantly improved, and consequently, the protective layer can be made extremely thin, so that it can also contribute to an increased recording density.

12 Claims, 3 Drawing Sheets

FIG.3

| No. | FILM FORMATION CHAMBER 1 | FILM FORMATION CHAMBER 2 | FILM FORMATION CHAMBER 3 | FILM FORMATION CHAMBER 4 | FILM FORMATION CHAMBER 5 | YOUNG'S MODULUS IN HEAD PRESSING DIRECTION | YOUNG'S MODULUS IN HEAD RUNNING DIRECTION | TEST 1 FRICTION COEFFICIENT | TEST 2 NUMBER OF SCRATCHES |
|---|---|---|---|---|---|---|---|---|---|
| 1 | A | D | A | D | A | 220GPa | 110GPa | 0.25 | 0 |
| 2 | A | B | A | B | A | 230GPa | 170GPa | CRASH | 0 |
| 3 | B | D | B | D | B | 170GPa | 90GPa | 0.6 | 1 |
| 4 | B | C | B | C | B | 150GPa | 55GPa | 0.11 | 4 |
| 5 | D | C | D | C | D | 130GPa | 60GPa | 0.35 | 25 |

CONDITIONS A; Ar:H2:N2=6:1:3  7mTorr FILM THICKNESS 1.5nm
CONDITIONS B; Ar:H2:N2=6:2:2  7mTorr FILM THICKNESS 1.5nm
CONDITIONS C; Ar:H2=6:4  10mTorr FILM THICKNESS 1.5nm
CONDITIONS D; Ar:H2=8:2  10mTorr FILM THICKNESS 1.5nm

FIG.4

| No. | FILM FORMATION CHAMBER 1 A | FILM FORMATION CHAMBER 2 B | FILM FORMATION CHAMBER 3 A | FILM FORMATION CHAMBER 4 B | FILM FORMATION CHAMBER 5 A | YOUNG'S MODULUS IN HEAD PRESSING DIRECTION | YOUNG'S MODULUS IN HEAD RUNNING DIRECTION | TEST 1 FRICTION COEFFICIENT | TEST 2 NUMBER OF SCRATCHES |
|---|---|---|---|---|---|---|---|---|---|
| 1 | 2nm | 2nm | 2nm | 2nm | — | 90GPa | 55GPa | CRASH | >100 |
| 2 | — | 2nm | 2nm | 2nm | 2nm | 215GPa | 105GPa | 0.32 | 0 |
| 3 | 2.5nm | 2.5nm | 2.5nm | — | — | 225GPa | 180GPa | CRASH | 10 |
| 4 | — | 2.5nm | 2.5nm | 2.5nm | — | 75GPa | 50GPa | CRASH | >100 |
| 5 | 4nm | 4nm | — | — | — | 65GPa | 50GPa | CRASH | >100 |
| 6 | — | 4nm | 4nm | — | — | 230GPa | 195GPa | CRASH | 15 |

CONDITIONS A; Ar:H2:N2=6:1:3  7mTorr
CONDITIONS B; Ar:H2=6:4  10mTorr

MAGNETIC RECORDING MEDIUM AND MAGNETIC MEMORY

TECHNICAL FIELD

The present invention relates to a magnetic recording medium and a magnetic storage apparatus, and more particularly to a magnetic recording medium which exhibits a high sliding durability, is suitable for high density recording, and stably provides reproducing outputs, and a highly reliable magnetic storage apparatus which is equipped with this magnetic recording medium.

BACKGROUND ART

Magnetic disk apparatus are now indispensable as main storage devices for information related apparatus such as computers and so on, and a higher capacity and faster recording/reproducing are increasingly required therefor as the need for faster processing of a huge amount of data arises for images and audio. For this purpose, faster read/write operations as well as a higher recording density are required. It is essential, as to the recording density, to reduce as much as possible the substantial distance from an element of a recording/reproducing head to a recording film of a magnetic disk serving as a recording medium, and to reduce a track width, and as to the faster operations, to increase the speed of data processing, rotational speed, and seek speed. With these improvements, a magnetic head, which has conventionally operated with a sufficient spacing from a magnetic disk, is forced to operate in a so-called intermittent contact state in which the magnetic head operates nearly in contact with the magnetic disk at a high speed. In addition, for reducing the substantial distance between a magnetic head element and a recording film of a magnetic disk as mentioned above, it is necessary to make a protective layer and a lubricant layer, intervening therebetween, as thin as possible. Specifically, the protective layer should be 10 nm or less; the lubricant layer should be 2 nm or less; and an average spacing between the disk surface and the head should be 30 nm or less, where a contact could occur as the case may be. To realize a magnetic disk which is fit for practical use in such extremely tight conditions, it goes without saying that a key point lies in how to design materials and shapes for the protective layer, the lubricant layer, and a contact portion of the head.

The protective layer and the lubricant layer of the magnetic disk have been conventionally improved from a viewpoint of an increase in abrasion resistance, sliding resistance, corrosion resistance, and soon. The protective layer has been practically made of an amorphous carbon film formed by sputtering graphite in an Ar atmosphere, amorphous hydrogenated carbon film formed likewise by sputtering graphite in an Ar+H2 or Ar+CH4 atmosphere, and so on. In addition to those, a variety of protective films have been under consideration such as those made of diamond-like carbon formed by plasma CVD with a hydrocarbon gas, a carbon film containing a variety of additive elements such as Si, Ti, W, Fe and so on, BN, SiO2, and so forth. Further, JP-A-62-287415 discloses an example which employs a laminate of two types of carbon layers having different hardness, and a soft underlying layer as a buffer layer, particularly with the object of improving a mechanical strength. JP-A-9-91687 also discloses an example which has a protective film having a hardness varying in a film thickness direction. However, either of them is not fit for practical use due to insufficient strength or corrosion resistance when an extremely thin film of 10 nm or less in thickness is concerned.

In respect to the lubricant layer, on the other hand, perfluoropolyether based lubricating oils having absorptive functional groups at terminals are typically used, and a number of lubricants having terminal groups exhibiting an improved integrity with a protective layer have been disclosed.

In conventional use environments, however, considerations on the protective layer and the lubricant layer only have to be made for sliding with a head upon starting and stopping a disk apparatus, i.e., a so-called contact start stop. In actual read and write operations, no problem associated with sliding arises, since the head is spaced from the disk, except for introduction of foreign substances therebetween.

In contrast, a high recording density magnetic disk apparatus for high speed processing, addressed by the present invention, is highly damageable to a contact of a head with a disk rotating at a high speed, or interactions of the two through an air flow or the like, if not contacting, causing damages on a protective layer and resulting damages on the disk itself, so that a need exists for a protective layer which possesses in combination different performance from conventional ones. Thus, any of the above cited techniques is not fit for practical use in an disk apparatus which requires low flotation and extremely thin films, as intended by the present inventors.

It is an object of the present invention to provide a magnetic recording medium which exhibits less damages and a high durability in high speed low flotation sliding, and a highly reliable magnetic storage apparatus by realizing a magnetic recording medium having an extremely thin protective layer having a substantial thickness of 10 nm or less, which can even be used in such severe conditions.

DISCLOSURE OF THE INVENTION

To solve the problems mentioned above, the present invention provides a protective layer made of particular materials. In the following, detailed description thereon will be made.

An exemplary cross-sectional structure of a magnetic recording medium according to the present invention is illustrated in FIG. 1. A substrate 1 is a discoidal disk having a hole formed through a central portion thereof, which is typically made of an aluminum-magnesium alloy plated with NiP, or a glass substrate processed to enhance the mechanical strength. In the present invention, though not particularly specified for its materials, the surface of the substrate should be as smooth as possible with a center-line average roughness being equal to or less than several nm, and preferably 1 nm or less. An underlying layer 2 is used to improve the crystallinity of a magnetic layer 3, and may be made of, for example, Cr or an alloy thereof. Of course, the underlying layer 2 may be in a multilayer structure. The magnetic layer 3 is used to record signals, and is made of, for example, Co-based alloy materials or the like. While ternary alloys such as CoCrTa, CoCrPt, CoCrV, CoNiCr, CoNiV and so on are typically used, a fourth element and/or an oxide may be added to them.

A protective layer 4 is a layer having a particular mechanical strength characteristic which characterizes the present invention. The particular mechanical strength characteristic is specifically expressed by the ratio of a Young's modulus of the protective layer 4 measured in a direction in which a head is pressed against the protective layer 4 to that measured in a direction in which the head runs, at an indentation depth equal to or less than one half of the thickness of the protective layer 4. Assuming that the Young's modulus in the pressing direction is Ed, and the Young's modulus in the running direction is Ec, the particular mechanical strength characteristic refers to the one having Ec/Ed equal to or less than 0.5. For this measurement, a conical indentator with a distal end having a curvature R of 0.1 microns or less, or a pyramidal indentator, by way of example, is indented to the above-mentioned depth with a microload, and is applied with microvibrations at that position in the head pressing direction or in the head running direction. Then, the Young's modulus may be found from the relationship between the amount of deformation within a range, in which no plastic deformation arises, and a bearing stress.

For largely varying the mechanical characteristic of the protective layer in a direction perpendicular to a substrate surface and in a direction parallel to the same, the protective layer may be formed in a laminate structure having laminated layers of different properties. Particularly, for forming a film having a larger Young's modulus/hardness ratio in the vertical direction and a smaller Young's modulus/hardness ratio in the horizontal direction, as required by the present invention, layers having progressively decreasing a Young's modulus and layers having progressively increasing a Young's modulus may be laminated in alternation. Specifically, layers may be laminated as A-layers 5 and B-layers 6 in FIG. 1. For implementing layers having larger hardness·Young's modulus by the A-layers 5, and layers having smaller hardness·Young's modulus by the B-layers 6, the respective layers are preferably formed in smallest possible thicknesses, and the largest possible number of layers are laminated in order for these layers to integrally act. It should be noted that since the present invention is intended for a layer having the total film thickness of 10 nm or less, the respective layers should have a film thickness of 3 nm or less, and preferably 1 nm or less. Here, as a method suitable for this, there is a method of adding a carbon-based additive element which increases both the hardness and the Young's modulus and an additive element which decreases both the hardness and the Young's modulus to alternating layers, and laminating resultant layers. The former additive element causing an increase in both the hardness and the Young's modulus may be nitrogen, hydrogen below 20%, silicon, boron or the like, or a mixture of nitrogen and hydrogen below 20%, or the like, and the latter additive element causing a decrease in both the hardness and the Young's modulus may be hydrogen exceeding 20%, oxygen, fluorine, or the like.

As an exemplary structure representing the characteristic of the present invention, the aforementioned nano-indentation evaluation (evaluation through microindentation) was conducted on a layer having the total film thickness of 10 nm formed of five carbon nitride films containing 10% of nitrogen having a thickness of 2 nm and five hydrogenated carbon films containing 40% of hydrogen having a thickness of 2 nm, laminated alternately on a silicon substrate, and the results are shown in FIG. 2. As a comparison, FIG. 2 also shows the results of evaluation on a single layer made of each of the films having a thickness of 10 nm. As can be seen from FIG. 2, the Young's modulus in the direction perpendicular to the laminate ($\perp$) exhibits a slightly larger value than the average of the Young's modulus of the respective single-layer films, while the Young's modulus in the direction parallel ($\parallel$) to the laminate exhibits a smaller value than the average of the Young's modulus of the respective single layer films, so that the laminate can demonstrate the effect of the present invention. In FIG. 1, a lubricant layer 7 may be provided on the protective layer 4 of the present invention. As lubricant layer 7, perfluoropoly-ether with modified terminal groups is typically used at present. For example, a fluorinated oil with a molecular weight ranging from 1,000 to 10,000 having a main chain of perfluoropolyether and a polar group such as a hydroxyl group, an amide group, an amino group, an amine group, an ester group, a piperonyl group, or the like at a terminal may be used. In the present invention, likewise, the use of these effectively reduces a friction coefficient when in contact with a head, and prolongs the lifetime during a CSS operation or in stable continuous sliding. However, the lubricant layer is not effective to intermittent and impulsive contacts such as those intended by the present invention.

Next, a method of fabricating a magnetic disk according to the present invention will be described.

Used as a substrate is a disk having a predetermined outer diameter such as 2.5 inches, 3.5 inches or the like and a hole formed through a central portion thereof for mounting a spindle motor. The thickness, the shape of the end surface, and so on may be determined in accordance with particular applications, and the present invention is not limited thereto. Not to mention typically used aluminum-magnesium alloys plated with non-magnetic NiP, glass substrates having reinforced surfaces, and so on, other non-magnetic substrate materials may be used in a similar manner. However, the flatness of the surface is critical, so that the most flat possible substrate may be used.

The substrate is washed as it is or after surface processing called a "texturization" for reducing defects. A step of scrubbing wastes and contaminants attached on the surface with a brush, a pad or the like while supplying a detergent, a step of removing micro foreign substances in combination of a pure water spray and ultrasonic waves, and a drying step such as spin drying or warm air drying may be performed in combination. Also, a step of eluting an extreme surface layer with acid, alkali or the like, and a step of modifying the surface with plasma processing may also be combined. The present invention can be implemented irrespective of these steps.

A head start/stop region or a so-called CSS zone may be formed with ruggedness, if necessary, for preventing adhesion. For example, a laser spot may be irradiated to melt a substrate material on the irradiated region, and a ruggedness pattern formed during solidification may be arranged at proper intervals.

Next, the substrate is heated in vacuum for controlling the crystallinity of a magnetic layer, and a proper underlying metal layer is deposited by sputtering before a layer of ferromagnetic material is formed. A heating temperature, though depending on desired magnetic characteristics, generally ranges from 150° C. to 300° C. A frequently used underlying layer is made of Cr or a Cr alloy which exhibits a good lattice matching with the magnetic layer. The underlying layer and the magnetic layer may be formed of a plurality of layers instead of a single layer.

Next, a protective layer, the key of the present invention, is formed. While the protective layer may be formed in a different step from the magnetic layer, they should be formed in succession within the same vacuum chamber in order to prevent deterioration due to oxidization on the surface of the magnetic layer, and a reduction in adhesion therebetween. For this purpose, a multi-layer film successive forming system, later described, is used.

The protective layer of the present invention may be formed by film depositing techniques in vacuum such as sputtering, plasma CVD, ion beam deposition, and so on.

For forming the lubricant layer 7 on the protective layer 4, a bath is prepared in which a lubricating oil is dissolved in a solvent in a fixed concentration, and the disk substrate is immersed in the bath and slowly pulled up. Alternatively, a spin coating technique may be used by dipping a predetermined amount of solution on the surface of the disk, and rotating the disk substrate to coat the solution thereover. The thickness of the lubricating oil layer should be thin because an excessively thick layer would remain on the surface which contacts the head, and stick to the head. However, an excessively thin layer would produce a small effect, so that the thickness is preferably in a range of 5 to 20 angstrom.

The protective layer as described above is suitable for the object of the present invention by the following reasons.

An improved durability of the magnetic disk according to the present invention is accomplished by the following reason. Specifically, in current magnetic disks, a head is floated over the surface of a disk by air pressure produced by the rotation of the disk with an extremely short distance maintained therebetween. The spacing is in a range of 10 to 40 nm in average, so that it is often the case that minute vibrations and fluctuations of the head cause a portion thereof to come into contact with the disk, and fine dusts introduced into the spacing abrades the surface of the disk. Thus, it has become necessary to create a system which withstands not only sliding during start-up and stop period, i.e., the so-called contact start stop operation, but also instantaneous contacts during high speed rotation. On the other hand, since the recording width has been reduced to less than one micron, and the track width has become very narrow, a recording/reproduction output cannot be ensured unless the spacing between a magnetic recording medium and a head element is reduced as much as possible. In other words, the protective layer must be made as thin as possible. To satisfy mutually contradictory requirements as mentioned, a novel protective layer which can withstand high-speed, heavy-load contacts even in a reduced thickness is required.

The present invention provides a protective layer which has the properties most suitable for the high-speed, heavy-load contacts as mentioned above. Specifically, since the Young's modulus in the direction parallel to the surface of the protective layer is lower, a low counterforce is produced at the time of contact, and the protective layer itself elastically deforms to avoid the influence by the contact. The Young's modulus in the direction perpendicular to the surface of the protective layer is large so that the protective layer is more damageable to scratches caused by gripped foreign substances due to a contact and by edges of the head. As a result, a contact mode with less damages is provided. When the Young's modulus is reduced simply across an entire film, a soft contact occurs in the horizontal direction, whereas large penetration occurs in the depth direction. As a result, the film would suffer from a resultant deformed region extending widely to cause an increase in contact force, which would eventually exceed an elastic limit to end up in breakage through plastic deformation. On the contrary, when the Young's modulus is increased across the entire film, the penetration will be reduced, whereas a large counterforce will be produced if the head impacts the protective layer in the horizontal direction, resulting in a crack extending over the protective layer or the magnetic layer to end up in breakage.

To examine the mechanical strength of the protective layer in the plane direction, a tester as follows was prepared. Specifically, a diamond needle having a distal end polished into a spherical surface was mounted to a holder having precise parallel flat springs and fixed such that the diamond needle can be vibrated in the horizontal direction and in the vertical direction. Two induction coils were attached to the holder in the horizontal and vertical directions, such that the diamond needle could be finely vibrated by applying the respective coils with alternating currents. Further, changes in static capacitance were measured between horizontal and vertical metal foils attached to the holder and a fixed metal foil, such that horizontal and vertical loads on the distal end of the needle and positions corresponding thereto could be measured when the diamond needle was vibrated in each of the horizontal and vertical directions.

The magnetic disk fabricated in the aforementioned manner is fixed on a sample fixture of the apparatus, and the sample fixture is slowly elevated to press the diamond needle into the magnetic disk within an elastically deformable range. Next, the amplitude of the vibrations is gradually increased while the diamond needle is vibrated in the vertical direction at cycles of 1 Hz, and the relationship between a load and the amplitude is recorded. The load falling to zero before the needle is elevated to the upper limit indicates the occurrence of a plastic deformation, so that the vibrations are stopped, and the needle is removed. Next, the magnetic disk is slightly shifted, and the needle is pressed into a next point in a similar manner. This time, the needle is vibrated as the amplitude is gradually increased in the horizontal direction. A load in the horizontal direction falling to zero before the needle returns to the origin indicates the occurrence of a plastic deformation, so that the vibrations are stopped, and the needle is removed.

In this way, the loads immediately before the occurrence of plastic deformations in the vertical direction and the horizontal direction, and the loads produced when the needle was vibrated with a constant amount of amplitude within the elastically deformable range were found to derive the modulus of elasticity and elastic limit stresses in the horizontal and vertical directions.

Further, a magnetic storage apparatus according to the present invention comprises a magnetic recording medium; a driving unit for driving the magnetic recording medium; a magnetic head for recording and reproducing information on and from the magnetic recording medium; unit for moving the magnetic head relative to the magnetic recording medium; and signal recording/reproducing processing unit for inputting a signal to the magnetic head and reproducing signal outputted from the head, wherein the aforementioned magnetic recording medium is employed as the magnetic recording medium.

BRIEF DESCRIPTION OF THE DRAWINGS

FIG. 3 is a table listing Evaluation Result 1 for an embodiment of the present invention;

FIG. 4 is a table listing Evaluation Result 2 for the embodiment of the present invention.

BEST MODE FOR CARRYING OUT THE INVENTION

An embodiment of the present invention will hereinafter be described in detail with reference to the accompanying drawings.

<<Embodiment 1>>

Figure 1:
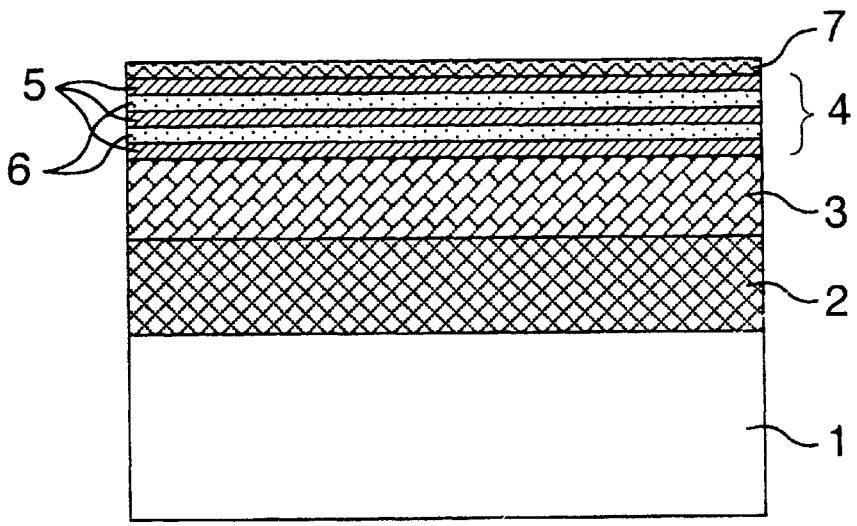
FIG. 1 is a cross-sectional view illustrating the structure of a magnetic disk according to the present invention.
Figure 2:
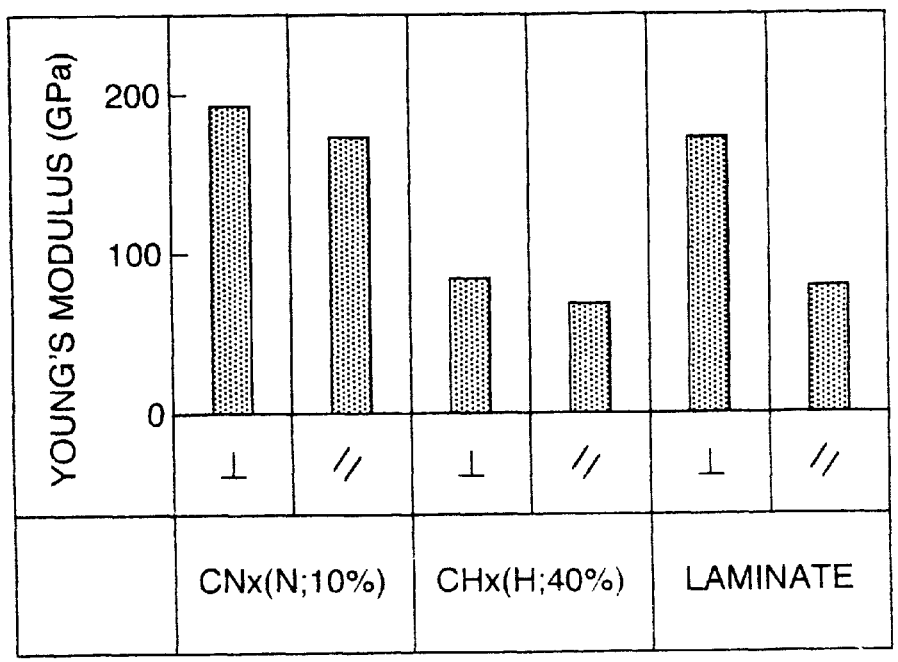
FIG. 2 is a graph showing a comparison of the Young's modulus of a magnetic disk according to the present invention and the Young's modulus of prior art magnetic disks.

A disk substrate made of an Al-Mg alloy having an outer diameter of 3.5 inches and plated with non-magnetic Nip was prepared, and its surfaces were polished for smoothing, and machined with micro-grooves in the circumferential direction. The surface roughness after the machining was approximately 0.5 nm in Ra. The substrate was washed to remove foreign substances and organic contaminants, dried, and then processed for film deposition in a multi-layer film successive forming apparatus. In a film deposition step, the substrate was introduced from a load-lock chamber into a vacuum, headed to 250° C. with an infrared heater, and then sequentially formed with a Cr underlying layer, a CoCrPt magnetic layer, and a protective layer. Conditions were adjusted such that Cr had a thickness of 20 nm; CoCrPt, 20 nm; and the protective layer, 7.5 nm. Here, the protective layer was formed using five film formation chambers by DC magnetron sputtering of a graphite target in alternately changing gas atmospheres. Specifically, as the atmosphere in film formation chambers 1, 3, 5, the A-layers in FIG. 1 were formed using a mixture gas of Argon, hydrogen and nitrogen in a ratio of 6:1:3 at a gas pressure of 7 mTorr. In film formation chambers 2, 4, the B-layers in FIG. 1 were formed using a mixture gas of Argon and nitrogen in a ratio of 6:4 at a gas pressure of 10 mTorr. The thickness of a film deposited in each chamber was chosen to be 1.5 nm. After extracting the resulting substrate from the vacuum chamber, the substrate was coated with a perfluoropolyether lubricant by a dip method in an average thickness of approximately 1.5 nm.

The Young's moduli measured in the head pressing direction and in the head running direction of the magnetic disk thus manufactured were 180 GPa in the head pressing direction, and 70 GPa in the head running direction.

A continuous sliding test was conducted on the magnetic disk fabricated as described above with a load of 5 gf at rotational speed of 5 m/s using a head for the test which had been fabricated by machining two rail sliders having a width of 200 microns by ion milling on the bottom of a block made of A1203-Tic ceramics having a length of 2 mm, a width of 1.5 mm, and a thickness of 0.4 mm.

When a portion of the disk on which the test head slid and a slider surface of the test head were observed with an optical microscope and AFM (atomic force microscope), no abrasion was detected. Also, when the amount of the lubricant in a slid portion of the disk was measured, it was revealed that approximately 95% of an unslid portion remained, and hence very few amount was lost.

Next, a so-called pico-head, used in an actual magnetic disk apparatus, was used. After the head was loaded on the disk rotating at 7200 rpm with a head floating amount adjusted to 18 nm, SiO2 particles of 100 nm in diameter were sprayed over the surface of the disk which was left rotating as it was for ten minutes. When the surface of the disk after the test was observed for damages with an optical microscope, no scratch was found.

Comparative Example 1

A magnetic disk was fabricated in the same manner as Embodiment 1 except that the film formation conditions were unified to Condition 1 (the hardness : Young's modulus is increased) in the five film formation chambers during the formation of the protective layer. The Young's moduli in the head pressing direction and the head running direction were 190 GPa and 160 GPa, respectively. When the continuous sliding test was conducted on this magnetic disk in the same manner as Embodiment 1, the result showed that the friction coefficient increased as the number of times of sliding was larger, and the friction coefficient exceeded 1.0 immediately before 10,000 times were reached, resulting in a crash. Also, in the $SiO_2$ spray test, scratches extending long in the circumferential direction occurred 100 per surface, and embedded $SiO_2$ particles were also found.

Comparative Example 2

A magnetic disk was fabricated in the same manner as Embodiment 1 except that the film formation conditions was unified to Condition 2 (the hardness:Young's modulus is decreased) in the five film formation chambers during the formation of the protective layer. The Young's moduli in the head pressing direction and the head running direction were 85 GPa and 81 GPa, respectively. When the continuous sliding test was conducted on this magnetic disk in the same manner as Embodiment 1, the result showed that the friction coefficient was initially approximately 0.1, and did not increase until 30,000 times, however, the friction coefficient subsequently increased as the number of times of sliding was larger, and reached 7.5 gf at the 100,000 times. Then, after the rotation was stopped, the slider was maintained in contact with the disk for one day, and then, a frictional force was measured upon starting the rotation, and was approximately 15 gf, indicating that the head was significantly stuck to the disk. When a portion of the disk on which the test head slid and a slider surface of the test head were observed with an optical microscope and AFM, the protective film was abraded approximately 5 nm on the disk surface, and scratches were also observed on the slider surface. Further, an agglomerate of the lubricant was found in an end portion of the slider. Also, when the amount of the lubricant in a slid portion of the disk was measured, it was revealed that approximately 30% of an unslid portion remained, and hence a significant amount was lost.

Next, when the $SiO_2$ spray test was conducted, the protective layer was scraped off in one minute or less, and scratches reaching the magnetic layer occurred, resulting in a crash.

FIG. 3 shows in a table the results of similar evaluations in Embodiment 1 with varying film formation conditions in the film formation chambers 2, 4. It can be understood from the table that a protective layer exhibiting excellent characteristics has the Young's modulus in the head pressing direction equal to or larger than 150 GPa, and the ratio of the Young's modulus in the head running direction to the Young's modulus in the head pressing direction equal to or less than 0.5.

FIG. 4 shows in a table the results of evaluations made on magnetic disks which were fabricated in a similar manner to Embodiment 1 except that the number of the film formation chambers was reduced one by one, and the total film thickness was adjusted to be in a range of 6 to 8 nm. As shown in the table, a protective layer composed of two or less layers is largely affected by the top layer and cannot attain the ratio of the Young's moduli required by the present invention.

Figure 5:
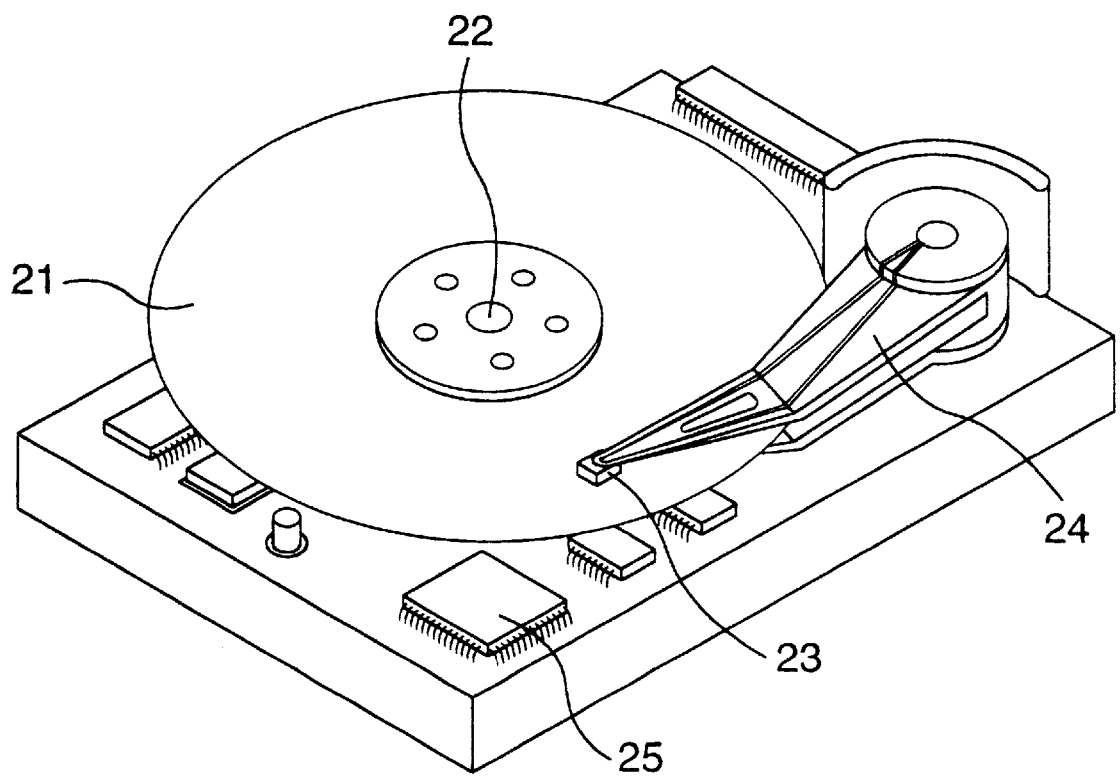
FIG. 5 is a schematic plan view of a magnetic storage apparatus according to the present invention.

FIG. 5 is a schematic plan view of a magnetic storage device according to the present invention. The magnetic storage device comprises one or a plurality of magnetic disks 21 shown in the aforementioned Embodiment 1; a magnetic head 23 corresponding to an information recording surface of the magnetic disk 21; a driving unit 22 for driving the magnetic disks 21 for rotation; a magnetic head driving device 24; and a signal processing unit 25. Preferably, as a magnetic head 23, a composite head (MR head (Magnetoresistive Head)) composed of an electromagnetic induction recording head and a magnetoresistive reproducing head, or a GMR head (Giant Magnetoresistive Head) is used in combination.

INDUSTRIAL APPLICABILITY

The present invention can provide a magnetic disk which has a sufficient strength and a sliding resistance even with a protective layer having a substantial thickness of 10 nm or less, and improve a resistance to lubricant adhesion. In addition, a magnetic disk storage device equipped with this magnetic disk can be a highly reliable magnetic disk storage device which exhibits stable recording/reproduction characteristics.

What is claimed is:

1. A magnetic recording medium comprising at least a substrate, a ferromagnetic thin film recording layer formed on a non-magnetic underlying layer, deposited on said substrate, and a protective layer and a lubricant layer overlying said recording layer, characterized in that a Young's modulus in a direction perpendicular to the surface of said recording medium is twice or more larger than a Young's modulus in a head running direction when penetrated 5 nm from the top surface thereof.

2. A magnetic recording medium according to claim 1, characterized in that the Young's modulus in the head pressing direction is 150 GPa or more.

3. A magnetic recording medium according to claim 2 characterized in that said magnetic recording medium is a magnetic disk.

4. A magnetic recording medium according to claim 3, wherein said substrate is made of one of an aluminum alloy and a glass, said non-magnetic underlying layer is made of one of Cr and an alloy thereof, and said ferromagnetic thin film is made of a Co alloy.

5. A magnetic recording medium comprising at least a substrate, a ferromagnetic thin film recording layer formed on a non-magnetic underlying layer, deposited on said substrate, and a protective layer and a lubricant layer overlying said recording layer, characterized in that said protective layer is formed by alternately laminating a layer made of carbon including one of one element of nitrogen, hydrogen below 20%, silicon and boron, and elements of hydrogen below 20% and nitrogen, and a layer made of carbon including one element of oxygen, hydrogen below 20% and fluorine, each said layer having a thickness of 3 nm or less, and said protective layer having a total thickness of 10 nm or less.

6. A magnetic recording medium according to claim 5, characterized in that said magnetic recording medium is a magnetic disk.

7. A magnetic storage apparatus having a magnetic recording medium, a driving unit for driving said magnetic recording medium, a magnetic head for recording and reproducing information on and from said magnetic recording medium, means for moving said magnetic head relative to said magnetic recording medium, and a signal recording/reproducing processing means for inputting a signal to said magnetic head and reproducing a signal outputted from said magnetic head, characterized in that:

said magnetic recording medium comprises at least a substrate, a ferromagnetic thin film recording layer formed on a non-magnetic underlying layer, deposited on said substrate, and a protective layer and a lubricant layer overlying said recording layer, wherein a Young's modulus in a direction perpendicular to the surface of said recording medium, when penetrated 5 nm from the top surface, is twice or more larger than a Young's modulus in a head running direction.

8. A magnetic storage apparatus according to claim 7, characterized in that a reproduction section of said magnetic head includes a magnetoresistive head.

9. A magnetic storage apparatus according to claim 7, characterized in that a reproduction section of said magnetic head includes a GMR head.

10. A magnetic storage apparatus having a magnetic recording medium, a driving unit for driving said magnetic recording medium, a magnetic head for recording and reproducing information on and from said magnetic recording medium, means for moving said magnetic head relative to said magnetic recording medium, and a recording/reproducing signal processing means for inputting a signal to said magnetic head and reproducing a signal outputted from said magnetic head, characterized in that:

said magnetic recording medium comprises at least a substrate, a ferromagnetic thin film recording layer formed on a non-magnetic underlying layer, deposited on said substrate, and a protective layer and a lubricant layer overlying said recording layer, wherein said protective layer is formed by alternately laminating a layer made of carbon including one of one element of nitrogen, hydrogen below 20%, silicon and boron, and elements of hydrogen below 20% and nitrogen, and a layer made of carbon including one element of oxygen, hydrogen below 20% and fluorine, each said layer having a thickness of 3 nm or less, and said protective layer having a total thickness of 10 nm or less.

11. A magnetic storage apparatus according to claim 10, characterized in that a reproduction section of said magnetic head includes a magnetoresistive head.

12. A magnetic storage apparatus according to claim 10, characterized in that a reproduction section of said magnetic head includes a GMR head.

* * * * *